United States Patent [19]

McCann et al.

[11] 4,303,695
[45] * Dec. 1, 1981

[54] CRINKLE EMBOSS AND METHOD

[75] Inventors: Thomas J. McCann, Hollywood; Ernest E. Regan, Fort Lauderdale, both of Fla.

[73] Assignee: Biscayne Decorative Products, Inc., Miami, Fla.

[*] Notice: The portion of the term of this patent subsequent to Jul. 11, 1995, has been disclaimed.

[21] Appl. No.: 64,436

[22] Filed: Aug. 7, 1979

Related U.S. Application Data

[63] Continuation of Ser. No. 862,641, Dec. 20, 1977, abandoned.

[51] Int. Cl.³ ............................ B32B 3/00; B05D 3/06
[52] U.S. Cl. ........................................ 427/44; 156/79; 427/55; 427/257; 427/373; 427/412.1; 427/412.4; 428/152; 428/158; 428/172; 428/282; 428/315; 428/334
[58] Field of Search ............... 428/156, 158, 159, 161, 428/310, 315, 331, 334, 282, 172, 152; 427/44, 54-56, 373, 257, 398 D, 407 R, 412.1, 412.4, 407.1; 156/78, 79; 204/159.19, 159.16, 159.22

[56] References Cited

U.S. PATENT DOCUMENTS

| | | | |
|---|---|---|---|
| 3,509,234 | 4/1970 | Burlant et al. | 204/159.16 |
| 3,699,084 | 10/1972 | Kehr et al. | 204/159.18 |
| 3,923,523 | 12/1975 | Nishikubo et al. | 204/159.19 |
| 3,924,023 | 12/1975 | Boranian et al. | 428/443 |
| 4,017,493 | 4/1977 | Ferment | 427/257 |
| 4,100,318 | 7/1978 | McCann et al. | 427/333 |
| 4,129,667 | 12/1978 | Lorenz | 204/159.19 |

*Primary Examiner*—Paul J. Thibodeau
*Attorney, Agent, or Firm*—Robert F. Hause

[57] ABSTRACT

A crinkle embossed surface on a flexible sheet goods substrate is created by means of applying an actinic radiation curable coating which is essentially solvent-free and comprises at least two photopolymerizable ethylenically unsaturated groups per molecule to the flexible sheet substrate. The coating is fully reacted and has developed essentially all of its physical properties upon exposure to actinic radiation in the temperature range of 180° to 250° F. for between five seconds and one minute time period resulting in a product having a clear, durable wearlayer, with stain resistant properties; scratch and scuff resistance as well as wear properties which are superior and having a uniform crinkled surface texture. A desired application is in the creation of crinkle embossing on vinyl sheet products such as sheet vinyl floor and wall coverings, table coverings, book covers, coated fabrics for use in upholstery, clothing and automobile interiors, shoes, handbags, decorative vinyl laminates and the like.

19 Claims, 5 Drawing Figures

CRINKLE EMBOSS AND METHOD

CROSS-REFERENCE-TO-RELATED-APPLICATION

This is a continuation of application Ser. No. 862,641, filed Dec. 20, 1977, now abandoned.

FIELD OF THE INVENTION

The present invention relates to the creation of a crinkle emboss on a flexible sheet goods substrate such as sheet vinyl floor and wall coverings, table coverings, book covers, coated fabrics for use as upholstery, clothing and automobile interiors, shoes, handbags, decorative vinyl laminates and the like. The actinic radiation cured product has a clear, durable coating with improved properties of wear and stain resistance and gloss retention over that of the flexible sheet substrate. The flexible sheet substrate may be non-cellular or it may be a cellular substrate with a clear non-cellular overlay.

SUMMARY OF THE PRIOR ART

In the production of commercially acceptable sheet products including coverings and the like, it has been found desirable to impart textured characteristics to the surface of such materials.

The conventional methods utilized for surface texturing are by chemical and mechanical embossing.

Chemical embossing is well taught in Nairn U.S. Pat. Nos. 3,293,094 and 3,293,108 wherein the decomposition temperature of a chemical blowing agent dispersed in a resinous polymer composition is controlled by applying an inhibitor to the surface of the composition. The subsequent application of heat to the composition selectively decomposes the blowing agent, thereby resulting in the formation of either depressed or raised areas in the final product at the points of inhibitor application.

Mechanical embossing of resinous composition sheets is conventionally accomplished with an embossing roll or plate which has been engraved or otherwise treated to create the design desired in raised relief on its surface. The sheet and/or embossing surface is heated and the design pressed into the heat-softened sheet. While both chemical and mechanical embossing techniques are employed, there are disadvantages to both techniques. With chemical embossing techniques the chemical inhibitor being utilized must be carefully controlled in the chemical ink formulation to result in the desired texturing effects. Also, in products that have relatively thick foam layers and/or thick wear layers, it has been found very difficult to achieve deep embossing. Mechanical embossing has not been fully satisfactory or practical to produce a relief pattern effect in registration with a printed pattern on a foamed material by using emboss rolls. Because the foamed material is yielding and compressible, it is very difficult to maintain accurate registration between the printed pattern and the embossing roll. Also, mechanical embossing of foamed material results from the crushing of foam cells. The gases which are displaced from the crushed foam cells must be free to dissipate laterally. If the gas is restricted from lateral dissipation, it will create blistering in the product.

Both chemical and mechanical embossing produce a partial or total elimination of the foamable underbody in certain selected areas to create the desired relief or texture. This elimination of the foamable layer in certain areas of the sheet results in less cushion and resilience in the unfoamed areas.

U.S. Pat. No. 4,017,493 to Ferment et al teaches the application of a polyurethane coating comprising an aliphatic or cycloaliphatic polyurethane of the moisture-cure type to a polyvinyl chloride substrate; (a) heating the polyurethane coated polyvinyl chloride substrate to a temperature between 100° and 160° C. for one to ten minutes; (b) aging the coated polyvinyl chloride substrate at least one week and then heating the coated substrate to a temperature between 140° C.–210° C. for 0.1 to 10 minutes to create a textured surface. Inherent in the system of Ferment U.S. Pat. No. 4,017,493 is the imperative use of an explosion proof curing oven coupled with a solvent recovery system. Both features add significantly to the cost of production. Furthermore, any moisture cure results in potential voids or pockets in the coating which invites staining and also results in a residual tackiness of the product. These deficiencies are overcome by the present invention which employs a solvent free system.

RELATED APPLICATIONS

Ser. No. 754,431 filed Dec. 27, 1976 and issued on July 11, 1978, as U.S. Pat. No. 4,100,318 teaches the application of an actinic radiation curable coating to a cushioned vinyl product comprising an expanded vinyl foam and clear vinyl overlay atop a carrier where a decorative pattern is usually present. The coating is fully reacted upon exposure to actinic radiation resulting in a tack free surface with improved stain resistance, gloss, scratch and abrasion resistance. U.S. Pat. No. 4,100,318 further details the inherent problems encountered with a solvent born moisture cured coating specifically in column 1 line 37 through column 2 line 27 and are incorporated herein by reference.

SUMMARY OF THE INVENTION

The object of the invention is to provide a process for creating a crinkle emboss by application of an actinic radiation curable coating on a flexible sheet goods substrate.

The method contemplates applying an actinic radiation curable coating which is essentially solvent-free and comprises at least one organic compound having at least two photopolymerizable ethylenically unsaturated groups per molecule to a fused flexible substrate at 100° F. to 180° F. The actinic radiation curable thus coated substrate is then passed through an ultraviolet lamping oven and exposed to ultraviolet light within the range of from 2500A to about 4000A at a temperature from 180° F. to 250° F. for five seconds to one minute to completely cure the actinic radiation curable coating and at the same time producing a crinkle finish emboss. The actinic radiation cured topcoat is a clear durable coating with improved properties of wear and stain resistance as well as gloss retention.

In view of the foregoing, it is a principal object of the present invention to provide a crinkle emboss on a flexible substrate, whereby, because of the differential in the physical properties of the actinic radiation curable coating (lower elongation) and the flexible substrate (high elongation), a permanent and reproducible distortion takes place at elevated temperatures. A further object of the present invention is to provide a crinkle emboss over a foamed substrate wherein the emboss is created from the combination of the clear overlay and the actinic radiation curable coating resulting in essentially no alteration in foam quality and, hence, no loss in resilience of the finished product as happens with mechanically or chemically embossed materials.

A further object of the present invention is to provide an actinic radiation curable coating system which can be adapted to existing processing by adding a direct roll coater, a bank of medium pressure mercury lamps with appropriate reflectors and shields, along with a gas sweep source.

Furthermore, an additional advantage is to provide a process for applying an actinic radiation curable coating over a substrate to produce a crinkle emboss without making an extra pass on equipment which is both time consuming and involves further expense. It is still a further object of the present invention to develop essentially complete physical properties of the actinic radiation curable coating immediately through exposure to actinic radiation resulting in satisfactory crinkle emboss definition without having to sit for a week for the coating to develop the necessary physical properties to produce a satisfactory texture as is taught with the moisture-cured urethane coatings described in U.S. Pat. No. 4,017,493.

Still another object of the present invention is to provide a photopolymerizable coating on a flexible substrate which is essentially 100% reactive, thereby minimizing the possibility of the entrapment of volatile components such as solvents as are present with the moisture-cured polyurethanes and can result in property weakening voids in the finished coating.

DESCRIPTION OF DRAWINGS

Further objects and advantages of the present invention will become apparent as the following description of the illustrative drawings proceed, along with the description of the product and method in which.

DESCRIPTION OF METHOD AND PRODUCT

Method

Figure 1:
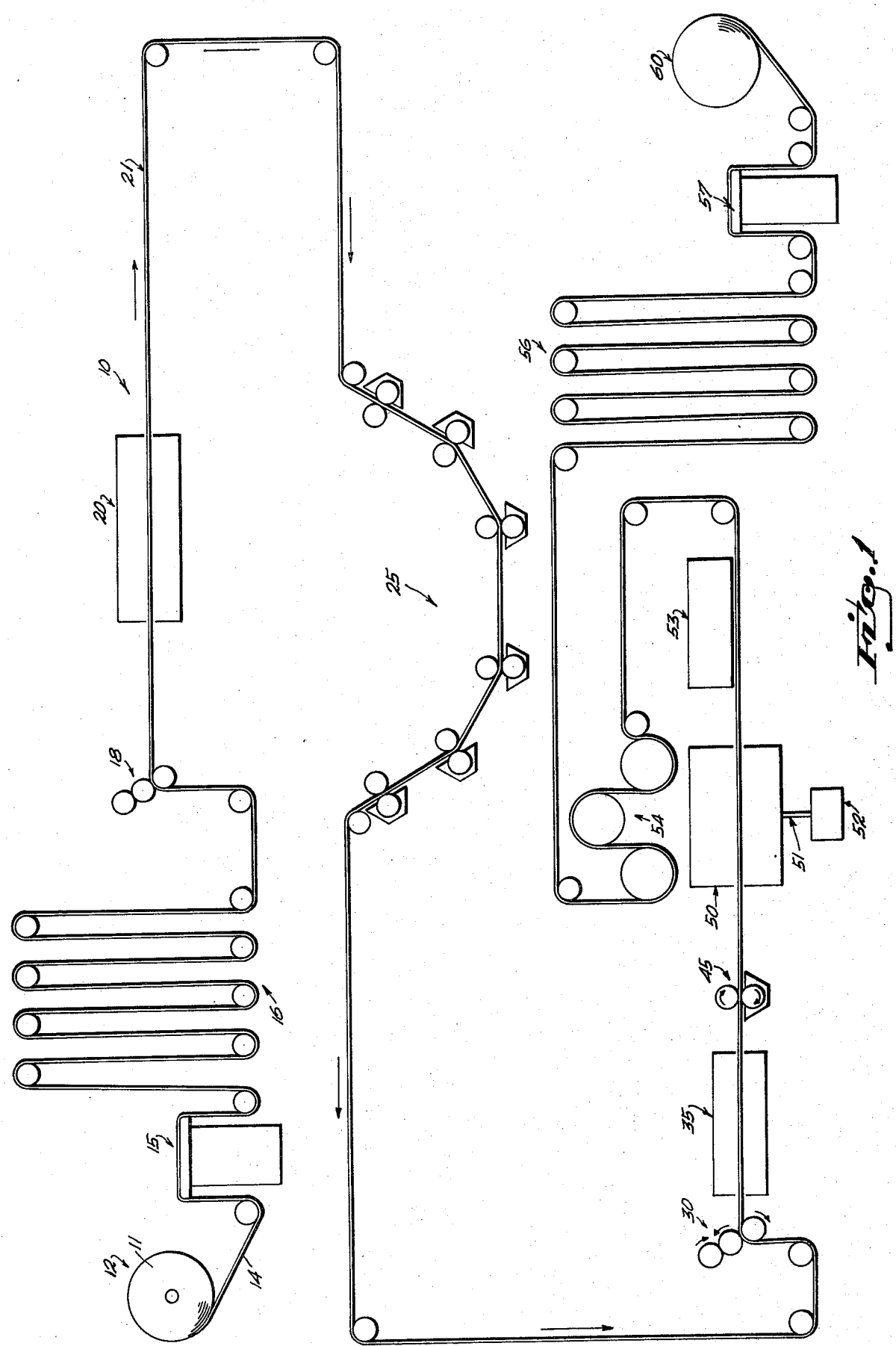
FIG. 1 shows a preferred flow-sheet for the manufacture of the subject product.

For a better understanding of the product, the method in which it is made will first be described as it is shown in FIG. 1 of the drawings. There it will be seen that that the flow system 10 contemplates a felt roll 11 which is secured to a felt let off assembly 12. The felt sheet 14 then proceeds over a slicing table 15, where different rolls of felt 11 may be exchanged as accommodated by the accumulator 16. After passing the accumulator 16, the felt is passed through a reverse roll foam coating assembly 18 where the initial vinyl coat is applied. Then, the coated felt is passed into the gel oven 20, and the coating is set. Subsequently, the foam coat 17 is set sufficiently that the same can be passed through the gravure printer 25. The specific gravure printer shown is a fixed station unit where a decoration is applied. After passing through the printer 25, the thus decorated vinyl is passed through a reverse roll coating assembly 30 where a clear vinyl overlay 22 is applied. The web is then passed through a fusion and expansion oven 35. Upon exiting the oven, the foamable coat expands to a cellular foam 17 and the clear vinyl overlay 22 is completely fused. The web is then passed over a cooling drum assembly 40. Thereafter the web is then passed through a direct roll coater assembly 45 and the 100% active actinic radiation curable coating 19 is applied to a thickness of 2.0 mils. After exiting the direct roll coater, the web then enters an ultraviolet lamping oven 50. Depending on whether the photopolymerizable coating is an air cured system or a system that requires an inert environment, the necessary gas sweep 52 is provided to the lamping unit. After leaving the ultraviolet assembly, the web is passed through an infrared oven 53. The finished product then is cooled by passing over cooling rolls 54 afterwhich it passes through the accumulator 56, over a splicing table 57, and onto the finished rolls 60, which are subsequently packaged and stored for shipment for ultimate use by the customer as floor and wall coverings and the like.

Product

Figure 5:
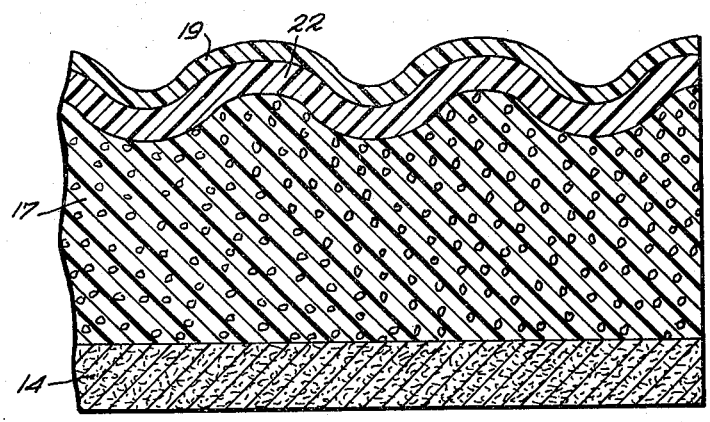
FIG. 5 shows a side view of the product.

The product desirably is a flexible substrate, such as vinyl, which has been coated with an actinic radiation curable coating which is essentially solvent-free and comprises at least two photopolymerizable ethylenically unsaturated groups per molecule. The coating is fully reacted upon exposure to actinic radiation in the temperature range of 180° F. to 250° F. for between five seconds and sixty seconds resulting in a coating which has immediately developed essentially all of its physical properties and having a uniform crinkled surface texture. The foregoing is illustrated in FIG. 5 showing a felt strip 14, cellular foam 17, transparent vinyl overlay 22, and actinic radiation curable coating 19.

The flexible vinyl substrate may be a non-cellular vinyl substrate with decorative effects printed thereupon such as decorative vinyl laminates. The flexible vinyl substrate may be a cellular vinyl with a non-cellular skin or topcoat such as is conventionally manufactured for floor and wall coverings. While some of the desirous applications for crinkle emboss have been noted it is understood that the process of the invention is widely applicable to many other areas where a crinkle emboss is desired on a flexilbe vinyl substrate. In a preferred embodiment of the invention, a crinkle emboss is created on conventional cushioned sheet vinyl floor covering.

In accordance with known practice, a foamable resinous polymer composition is applied to a base at the desired thickness and then heated to gel the composition to give a presentable printing surface. After printing, a clear vinyl overlay is applied and the composite is then heated under controlled conditions of time and temperature to fuse the vinyl layers and expand the foam.

The prior art resinous composition and methods are well taught in U.S. Pat. No. 3,293,094 and 3,293,108; however, a brief discussion of the ingredients and how they are employed in producing a finished cushioned vinyl sheet goods article will serve as good background information for the present invention.

The resinous compositions useful to form the product are preferably vinyl plastisol dispersons made up of appropriate amounts of polyvinyl chloride resins, plasticizers, blowing agents, pigments, activators, heat stabilizers, light stabilizers, and viscosity depressants.

Resins adaptable for use in formulating vinyl plastisols are commonly referred to as dispersion grade resins. Such resins are available having particle sizes of from about 0.2 to 2 microns. Dispersion grade resins are usually of higher molecular weight than calendar grade resins and have particle surfaces of a hard, horny nature. The preferred molecular weight for the foam grade resin is Relative Viscosity of 2.05. The preferred molecular weight for the clear vinyl overlay is Relative Viscosity of 2.65 and higher.

Plasticizer selection is important in determining the physical properties of the coating and its rheological characteristics. Esters of straight and branched long chain aliphatic and aromatic alcohols with aliphatic and aromatic acids are utilized depending on properties necessary in the fused form. Esters of aliphatic alcohols and acids impart low viscosity and good viscosity stability. Esters of the aromatic type impart good foaming characteristics to a plastisol. The plasticizer or blend of plasticizers is chosen to yield a composition of the desired viscosity and/or foaming characteristics. Blowing agents are well known in the art and the particular blowing agent selected usually depends on cost, resin, and density required. Blowing agents are complex organic compounds which, when heated, decompose to yield an inert gas and have residues which are compatible with the resin. Preferred blowing agents have the property of decomposition over a narrow temperature range which is particularly desirable to obtain a good foam structure. Typical types of blowing agents which are of significant interest to the invention are substituted nitroso compounds.

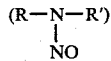

Substituted hydrazides (RSO$_2$NHNHR'), substituted azo compounds (R—N=N—R'), acid azides (R—CON$_3$), quanyl compounds

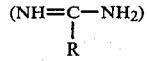

and the like wherein R and R' are hydrogen or hydrocarbon groups usually containing from one to ten groups.

The blowing agents which have found the most widespread use are those compounds having the N—N or —N=N—linkages which decompose at elevated temperatures to yield an inert gas high in nitrogen. These compounds have the general formula

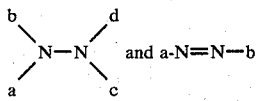

wherein, a, b, c and d are hydrocarbon groups preferably containing up to 10 carbon atoms, or hydrogen with at least one of the groups being a hydrocarbon group. Many of these hydrocarbon groups contain additional nitrogen groups such as hydrazide, amido, nitro, nitrile, and the like.

Blowing agents for use in the invention are decomposed an effective amount at a temperature below the decomposition temperature of the resin used. The preferred blowing agents are those that decompose above the elastomeric point of the resin composition since this enables at least partial gelling of the foamable coating so that a design can readily be printed on its surface. With the preferred vinyl polymers, a blowing agent decomposing between about 300° F. and 450° F. can be used. The degree of foaming of a typical plastisol formulation using different concentrations of blowing agents is shown in Table I.

TABLE I

| Parts by Weight of Azodicarbonamide per 100 parts by Weight Resin | Ratio of Foam Thickness to Original Thickness | Density, Pounds per Cubic Feet |
|---|---|---|
| 0.0 | 1/1 | 80 |
| 0.1 | 1.33/1 | 60 |
| 0.5 | 2/1 | 40 |
| 1.0 | 3/1 | 27 |
| 2.0 | 4.5/1 | 17.5 |
| 3.0 | 6.5/1 | 12.3 |
| 5.0 | 9.3/1 | 8.6 |

It has been found that density of from 15 to 50 pounds per cubic foot produces the most useful products. The thickness of the foam layer will depend in large measure on the final product desired. As a general rule, foam thicknesses of a 0.005 to about 0.150 inch are particularly useful.

The coating compositions may contain pigments in accordance with the particular color desired. Any of the organic and inorganic pigments well known in the art for pigmenting compositions can be used. Normally, from about 0.5 to about 5 parts pigment per 100 parts resin are used.

It is common practice to add accelerators or catalysts to the compositions to accelerate the decomposition of the blowing agent, reduce the decomposition temperature and/or narrow the decomposition range. Typical accelerators are various metal salts such as dibasic lead phosphite, dibasic lead stearate, dibasic lead phthalate and similar lead salts, zinc salts such as zinc laurate, zinc oxide, zinc stearate, zinc carbonate, zinc salt of mercaptobenzothiazole, zinc octoate, zinc naphtholate, zinc dust, and cadmium octoate. The agents can also serve as stabilizers for the composition. Minor amounts of stabilizers are usually incorporated in the coating composition to reduce the effects of degradation by light annd heat. Suitable light stabilizers include resorcinol disalicylate, resorcinol dibenzoate, phenyl phthalate, phenyl benzoate, o-tolyl benzoate, eugenol, guaicol, o-nitrophenol, o-nitroaniline, triethylene glycol salicylate, and organic phosphates and other complexes of such metals as barium, cadmium, strontium, lead, tin and the like. Suitable heat stabilizers include sulfides and sulfites of aluminum, silver, calcium cadmium, magnesium, cerium, sodium, strontium, and the like glycerine, leucine, alanine, o- and p-aminobenzic and sulfanilic acids, hexamethylene tetramine, weak acid radicals including oleates, ricinoleates, abietates, salicylates and the like.

If volatile diluents are used to reduce the viscosity of the coating composition, care must be taken that they are essentially removed prior to fusion and foaming. This removal can be accomplished by heating the composition at a temperature substantially below the fusion temperature and minimum decomposition temperature of the foaming agent for sufficient time to remove the volatile material.

The backing, carrier, or substrate utilized for the resinous coatings is usually a flexible sheet. Suitable flexible backing sheets include those formed of flexible resinous composition as well as sheets of woven fabric and impregnated felted fibers. It has been found that felted cellulose or asbestos fibrous sheets impregnated with a water resistant and strengthening saturant yield particularly desirable backing sheets for the production of products in accordance with the invention. The particular impregnant or saturant chosen must not only be capable of imparting strength and water resistance to the sheet of felted fibers, but must also meet the requirements of high temperature stability. The impregnant should be essentially free of volatile components and not soften to such an extent as to exude from the sheet. In addition, the saturant should not be subject to appreciable detrimental chemical changes such as oxidation. Some resin impregnants which produce a felted sheet with excellent physical properties are not compatible with the coating compositions to be applied. This may result in poor adhesion of the coatings to the base. In such cases, it is desirable to size the surface of the impregnated felt sheet to which the foamable composition is to be applied with a thin coating of material which has good adhesion to both the felt impregnant and the foamable composition. Acrylic polymers have been found particularly effective in aiding adhesion without causing sticking of the sized surface to the rolls during the processing. Suitable resins for use as impregnants include vinyl resins and its copolymers, acrylic resins, polyethylene, polystyrene, butadiene-styrene copolymer, butadiene-acrylonitrile copolymer, natural rubber, polymerized chloroprene and the like. Thermosetting resins such as phenolic resins, polyesters, oleoresins, polyurethane resins and the like are suitable.

The following examples are given for purposes of illustration and wherever "PARTS" are designated, it is parts by weight, unless otherwise noted:

EXAMPLE I TYPICAL FOAMABLE PLASTISOL FORMULATION

| Ingredients | Parts |
|---|---|
| Polyvinyl Chloride (dispersion grade, specific viscosity 0.60) | 50 |
| Polyvinyl Chloride (dispersion grade, specific viscosity 0.40) | 50 |
| ButylBenzyl Phthalate | 40 |
| Di (2-ethylhexyl) Phthalate | 20 |
| Titanium Dioxide | 7 |
| Azodicarbonamide | 2.5 |
| Diabasic Lead Phosphite | 1.5 |
| V.M. & P. Naphtha (Boiling Range 190°-275° F.) | 5 |

EXAMPLE II TYPICAL CLEAR VINYL OVERCOAT PLASTISOL

| Ingredients | Parts |
|---|---|
| Polyvinyl Chloride (dispersion grade, specific viscosity 0.50) | 100 |
| Alkylaryl modified phthalate ester (plasticizer) | 38 |
| Epoxidized Tall Oil Ester (secondary plasticizer) | 5 |
| 2,2,4-trimethyl-1,3-pentanediol diisobutyrate | 7 |
| Stabilizer (Calcium/Zinc/Phosphite) | 3 |
| V.M. & P. Naphtha (Boiling Range 190° to 275° F.) | 5 |

The invention is directed to the use of actinic radiation curing, preferably ultraviolet radiation, for the creation of a crinkle embossed surface on a flexible vinyl substrate by means of application of an actinic radiation curable coating, which is fully reacted upon exposure to such radiation in the temperature range of about 180° F. to 250° F. for between five seconds to one minute.

There are many irradiation techniques which can be employed to initiate curing and to promote cross linking of surface coatings. Electron beam radiation is an example of a very high energy irradiation technique which promotes extremely rapid polymerization. It is less desirable, however, for purposes of this invention unless used at low energy levels.

For purposes of this invention, ultraviolet radiation is the preferred source. Ultraviolet radiation induces a photochemical reaction which produces free radicals from the photoinitiators present in the photocurable formulation. These free radicals in turn cause polymerization of the monomers, reactive pre-polymers, and inert polymers present resulting in a cured film. Sources of ultraviolet radiation can be mercury vapor arc lamps, plasma arcs, pulsed xenon lamps and carbon arcs. Mercury vapor arc lamps are currently the most commonly used and include three types: low, medium and high pressures. High pressure mercury arc lamps are the most intense source of ultraviolet being ten times more powerful than the medium pressure mercury lamps, but they operate at very high temperatures, thus water cooling is generally required which may lead to instability of intensity. Also, because of their high operating temperatures, they only have a useful life of about 200 hours. The medium pressure mercury arc lamp will operate at a lower temperature than the high pressure mercury lamp and will have a useful lifetime of at least 1,000 hours. While the medium pressure mercury arc lamp operates at lower temperatures than high pressure lamps, temperatures of 800° C. are still attained and cooling must be accomplished efficiently. Air or water is generally used for cooling purposes. Low pressure mercury arc lamps operate at near room temperature and have a useful lifetime of 2,500 to 12,000 hours. They emit two levels of radiation centered at 254 nm and 185 nm, but intensity is too low. The medium pressure mercury arc lamps are the most commonly accepted because they offer much greater efficiency than low pressure mercury arc lamps and longer life than the high pressure mercury lamps. Not only do mercury arc lamps generate ultraviolet radiation, they also emit the infrared and visible region. Infrared radiation will not initiate polymerization, but does assist in propagation once initiation has been achieved.

Efficiencies of up to 50% have been claimed for ultraviolet generation of medium pressure mercury arc lamps. A lamp which generates a high percentage of ultraviolet radiation will generate a proportionately lower amount of visible and infrared radiation and vice versa.

Lamps operating at a low vapor pressure (in the medium range) require a higher amperage and generate a higher percentage of ultraviolet radiation. Lamps operating at a high vapor pressure (in the medium pressure range) require a higher voltage and generate more infrared radiation; thus, the ultraviolet output in a selection of medium pressure arc lamps will vary. The choice of lamps may well depend on the type of system to be cured.

Specific wavelengths of light most effective will vary depending upon the coating employed and the particular photosensitizer package employed. Generally speaking, wavelengths in the range of 2,500 to 4,000 angstroms are suitable.

The components of an ultraviolet curable formulation generally contain an unsaturated resin, a reactive monomer, a multifunctional monomer, and a photoinitiator. The multifunctional monomer serves a dual role as the crosslinking agent and as the reactive solvent. In most cases, the type of unsaturated resin will affect the properties of the ultraviolet coating more than either the reactive monomer or the multifunctional monomer.

The unsaturated resins are usually low molecular weight polymers or "oligomers" containing a functional group which participates in the polymerization process. Examples of such unsaturated resins are such compounds containing polar groups which are preferably urethanes. However, polyethers, polyesters, epoxies, amides and the like terminated by two or more photopolymerizable ethylenically unsaturated groups and which are preferably of the acrylic type can be employed.

The monofunctional monomers employed are important to the final film properties such as flexibility, adhesion, toughness and hardness. The monofunctional monomers lower the viscosity of the ultraviolet curable formulation. The monofunctional monomers are also extremely important to the cure rate of the system. For instance, acrylate monomers are approximately ten times faster than methacrylate monomers which, in turn, are more responsive than vinyl esters, vinyl ethers or styrenes.

Monomers that can be polymerized according to this invention have at least one polymerizable ethylenically unsaturated group of the structure

Of these monomers, the preferred are those containing at least one acrylyl group of the structure

CH₂=CHCO—

Illustrative of which one can mention, acrylic acid, methyl acrylate, ethyl acrylate, butyl acrylate, hexyl acrylate, 2-ethylhexyl acrylate, butoxyethyl acrylate, dicyclopentenyl acrylate, isodecyl acrylate, 2-phenoxyethyl acrylate, glycidyl acrylate, 2-ethoxyethyl acrylate, 2-methoxyethyl acrylate, 2-(N,N-diethylamino) ethyl acrylate, trimethoxyallyloxymethyl acrylate, vinyl acrylate, 2-hydroxypropyl acrylate, 2-hydroxyethyl acrylate. (methylcarbamyl) ethyl acrylate. The acrylyl compounds are well known and the above listed are only illustrative; the majority of photocurable compounds containing an acrylyl group may be suitable for use.

In addition to acrylyl monomers, others are the methacrylyl monomers, nitriles, olefins, vinyl halides, vinyl esters, vinyl ketones, vinyl ethers and thioethers, and miscellaneous sulfur and nitrogen containing monomers. Other photocurable monomers are readily apparent to one skilled in the art of polymerization chemistry. The specific compounds mentioned are illustrative only and not all inclusive. Multifunctional monomers are added along with monofunctional monomers which it is desired to increase the crosslink density of the coating. The multifunctional monomers are preferably of the acrylyl type such as neopentyl glycol diacrylate, penta-erythritol triacrylate, 1,6-hexanedioldiacrylate, trimethylolpropane triacryate. The multifunctional acrylic monomers listed are for illustrative purposes only. As with the monofunctional monomers listed above any multifunctional monomers capable of curing on exposure to radiation are suitable.

The photoinitiator system is a vital part of the ultraviolet curable formulation. Photoinitiators are compounds which will absorb radiation and convert the absorbed energy to a reactive triplet state which is a free radical and thus extremely reactive. One type of photoinitiator system utilized is by that of hydrogen abstraction. The existence of the carbonyl group is mainly responsible for the special properties of this photoinitiator system. Situated on the oxygen atom of the carbonyl group is a lone pair of electrons occupying a nonbonding orbital and is an electronic transition which confers free radical properties on the carbonyl group. The photoactivated carbonyl group must ineract with another substance which can donate a hydrogen atom.

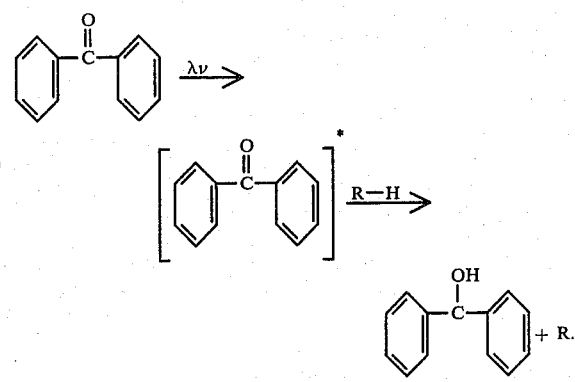

Photoactivated

Compounds which, in addition to the carbonyl group, contain other hetero atoms or groups which also have a lone pair of electrons associated with them seen to have a synergistic effect and the photo-activity of the carbonyl center is enhanced. Examples are:

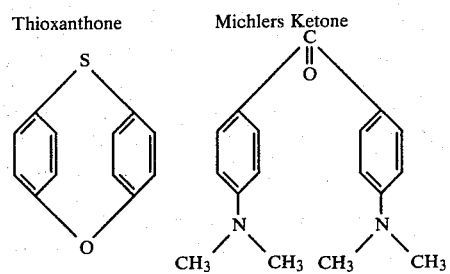

Another type of photo-initiator system undergoes heterolytic fission to break the carbon to carbon bond within the molecule as illustrated by the following:

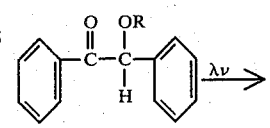

-continued

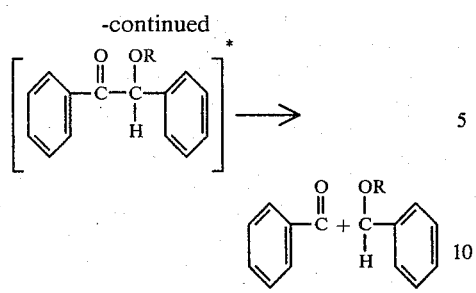

Air inhibition or oxygen effect on ultraviolet curing will rapidly terminate the free radical polymerization. The reason for this is that oxygen is a radical in its group state, hence its high reactivity towards other radicals. The reaction of oxygen with initiator and growing polymer radicals produces peroxy radicals ($PO_2^*$) which undergo H-abstraction from a hydrogen donor thereby terminating the chain. The overall effect is the formation of short polymer chains resulting in a tacky surface with poor coating characteristics. The faster the propagation, the less important is reaction with oxygen. A very active coinitiator with benzophenone type photo-initiator is a very reactive hydrogen donor. Tertiary amines are very reactive hydrogen donors in combination with benzophenone. The "alpha" amino radical formed reacts with oxygen levels in the coating as well as at the immediate surface.

Illustrative of such photo-initiators are benzoin, benzil, and benzoin ethers; polycyclic aromatic ketones i.e., benzophenone and its derivatives. Amines used as photo-synergist in combination with polycyclic aromatic ketones give remarkable acceleration of cure rate. Certain halogenated compounds have been found to be very effective photo-initiators. Other photo-initiators worthy of mention are mercapto compounds, amine oxides and phosphine derivatives.

Photo-initiators are employed in amounts from about 0.5% to 20% more commonly 1% to 5%. In selection of photo-initiator, those having high extinction coefficients at wavelengths which correspond to the emission band of the curing lamps, will be the most effective in promoting polymerization.

Illustrative of the type of photo-curable formulation in accordance with this invention:

EXAMPLE I

A photo-curable coating composition was produced having the following formulation in parts by weight:

| | |
|---|---|
| Acrylated Pluracol TP-340 | 65 |
| (BASFWYANDOTTE POLYETHER AVERAGE MOL. WGT 300) | |
| 1,6-Hexanediol Diacrylate | 20 |
| Isodecyl Acrylate | 10 |
| Benzoin Butyl Ether | 2.5 |

The acrylated polyether was the reaction product of (10 moles) ethyl acrylate and (1 mole) of Pluracol TP 340. Both 0.29 g phenothiazine and 0.14 g nitrobenzene were added as thermal polymerization inhibitors. The reactants were heated to 103° C. pot temperature at which temperature the water/ethyl acrylate azeotrope was removed. Pot temperature was cooled to 50° C. and 14.5 g of DuPont Tyzor TPT organotitanate complex catalyst was added. The reaction was allowed to increase slowly to a maximum of 130° C. At this point, the reactants were vacuum stripped of excess ethyl acrylate. The pot residue was mixed well with 1 g water to destroy the catalyst and then filtered to remove the spent catalyst.

Curing of 2.5 mils of the coating composition was accomplished in a nitrogen atmosphere by exposing for no more than 2 seconds irradiation with a 200 watt/inch Hanovia medium pressure mercury vapor lamp.

EXAMPLE II

A photo-curable coating composition was produced having the following formulation in parts by weight;

| | |
|---|---|
| Urethane Oligomer | 60 |
| Neopentyl Glycol Diacrylate | 15 |
| (Methyl Carbamyl) Ethyl Acrylate | 35 |
| Benzophenone | 2.5 |

The urethane oligomer was the reaction product at about 40° to 50° C. of one mole of poly (epsilon-cparolactone) having an average molecular weight of about 550 (which was produced by reacting epsilon-caprolactone using trimethylolpropane as the starter), 3 moles of isophorone diisocyanate and 3 moles of 2-hydroxyethyl acrylate. 2.0 mils cured to a dry film upon exposure to 2.2 kilowatts medium pressure mercury lamps in a nitrogen atmosphere.

EXAMPLE III

A photo-curable coating composition was produced having the following formulation in parts by weight.

| | |
|---|---|
| Methacrylated Polyester | 50 |
| Pentaerythritol Triacrylate | 25 |
| Trimethylolpropane Triacrylate | 15 |
| Acrylonitrile | 5 |
| B-Hydroxyethyl Acrylate | 10 |
| 2,5-Acetophenone | 2.5 |

The methacrylated polyester was prepared from polyester consisting of 2 moles of 1,6-hexanediol, 2 moles of adipic acid and 1 mole of isophthalic acid reacted with 2 moles of glycidyl methacrylate. Phenothiazine (0.05 g) and nitrobenzene (0.025 g) were added to the glycidyl methacrylate monomers to inhibit premature polymerization. The glycidyl methacrylate was added over a one hour period controlling the exotherm to 100° C. Upon completion of the addition, the reactants were held at 100° C. to 105° C. until an acid number of 18 was obtained.

Curing of 1.0 mil was accomplished upon exposure to 2–200 watt/inch medium pressure mercury lamps for 4 seconds under a nitrogen blanket.

EXAMPLE IV

| | |
|---|---|
| Acrylated Epoxy Resin | 30 |
| (Shell Chemical DRH-302 Bisphenol A-Epichlorohydrin Resin) | |
| Neopentyl Glycol Diacrylate | 45 |
| 2-Ethylhexyl Acrylate | 35 |
| Benzyldisulfide | 3.5 |

The acrylated epoxy resin was a conventional epoxypolymer which was further reacted with acrylic acid to impart acrylic type terminal unsaturation to the polymer.

2.0 mils was cured in a nitrogen atmosphere upon exposure to 2-200 watt/inch medium pressure mercury lamps.

90 PARTS

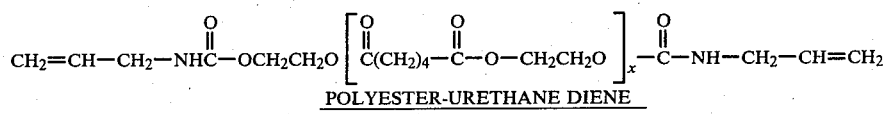
POLYESTER-URETHANE DIENE

10 PARTS

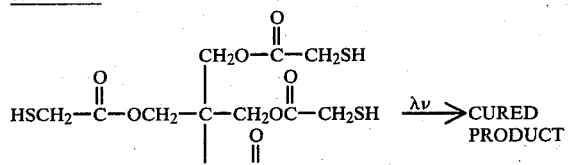
PENTAERYTHRITOL TETRAKIS (THIOGLYCOLATE)

1 PART

PHOTOINITIATOR

EXAMPLE V-AIR CURED COATING

| | |
|---|---|
| Urethane Adduct | 30 |
| Acrylated Epoxidized Soyabean Oil | 20 |
| (Methylcarbamyl) Ethyl Acrylate | 40 |
| Neopentyl Glycol Diacrylate | 10 |
| 2-Chlorothioxanthone | 2 |
| Methyldiethanolamine | 3 |

The urethane adduct was prepared by reacting at 40° to 45° C. 1.0 mole of trimethylhexamethylene diisocyanate dissolved in 0.1 mole of 2-phenoxyethyl acrylate with 2 moles of 2-hydroxyethyl acrylate. The acrylated epoxidized soyabean oil had an average of 2.2 acrylyl groups.

1.0 mil films were cured in air upon exposure to 2.2 kilowatts medium pressure mercury lamps.

EXAMPLE VI

| | |
|---|---|
| Acrylated Amine | 80 |
| N-Vinylpyrrolidone | 20 |
| Benzophenone | 3.0 |

The acrylated amine was prepared from a mixture of 53.5 grams diethylene glycol diacrylate and 8.6 grams of piperazine in 22 ml. of anhydrous methanol at 20° C. for one hour. After one hour, the methanol was stripped leaving a colorless liquid acrylated amine. Curing took place upon three second exposure under a 550 watt medium pressure mercury arc in a nitrogen atmosphere.

It will be appreciated that the examples herein presented of ethylenically unsaturated polymer materials for ultra-violet curing which meet the necessary prerequisites for coatings covered under this invention are given for illustrative purposes only. Other polymeric coating constituents capable of meeting the necessary prerequisites are also applicable.

For example, U.S. Pat. No. 3,699,084 describes a polyene having a molecule containing at least two unsaturated carbon to carbon bonds disposed at terminal positions on a main chain backbone of the molecule and a polythiol component having a molecule containing a multiplicity of pendant or terminally positioned-SH functional groups per average molecule and capable of curing in the presence of chemical free radical generation such as:

U.S. Pat. No. 3,509,234, to Burlant describes radiation curable coatings comprising vinyl monomers and a resin formed by first reacting a hydroxylated polymer consisting essentially of carbon, hydrogen and oxygen with one—NCO group from diisocyanate monomers to provide an isocyanate terminated polymer and subsequently reacting the remaining—NCO group from said diisocyanate monomers with a hydroxy alkylacrylate or hydroxy alkyl methacrylate monomer, thereby introducing into said resin, alphabeta olefinic unsaturated groups each of which are separated from the principal carbon to carbon chain of said resin by two urethane groups such as:

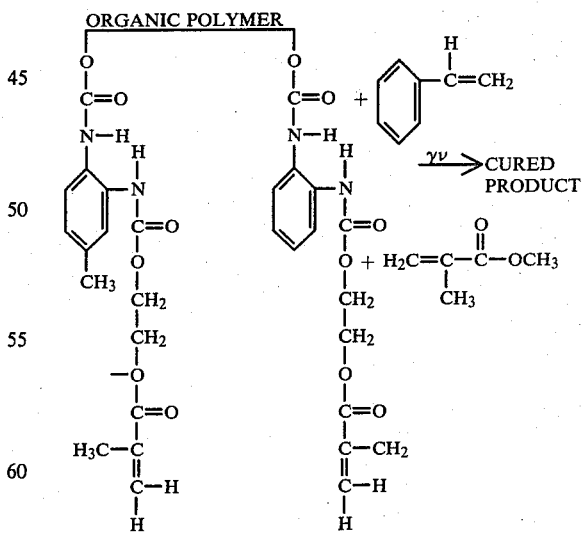

It is also known in the art, as set forth in U.S. Pat. No. 3,923,523, that a photo-curable composition can be obtained from a polyol having a photo-polymerizable alpha, beta-unsaturated ester group and a polycarboxylic acid anhydride such as pyromellitic acid anhydride along with a photo-polymerization initiator and optionally, a photopolymerizable monomer such as: (0.1 mole) of the reaction product of neopentyl glycol diglycidyl ether and acrylic acid (molar ratio ½) was dissolved in 70 g of N-vinyl pyrrolidone and (0.1 mole) of pyromellitic acid dianhydride was added to the solution with agitation. Then the mixture was reacted at room temperature for 24 hours. A polyester solution having a viscosity of 13,200 poise at 25° C. was obtained.

The photo-curable composition was prepared by adding 37.8 parts (by weight of the composition) of trimethylolpropane triacrylate, 2 parts of benzoinmethyl ether to 60 parts of the obtained polyester solution. The composition was cured to a 1.0 mil film upon exposure to a 500 watt high pressure mercury lamp at a distance of 30 cm requiring 0.3 seconds.

The present invention, it should be noted does not reside in any particular class of actinic radiation cured coatings. It will be appreciated, by those skilled in the art, that not all photo-curable coatings are suitable for the prerequisite characteristics set forth in this invention. For example, there are coating compositions that degrade quickly, and take a prolonged residence time and, would not be consistent with the process. Other coatings would be too brittle or have poor adhesion to the flexible vinyl substrate.

Not all ultraviolet curable coatings, when coated over a flexible substrate will give a crinkle type emboss at elevated temperatures. For instance, if one applies an ultraviolet curable coating over a flexible vinyl substrate with essentially the same physical properties, such as tensile and elongation as the flexible vinyl substrate and expose at elevated temperatures, one would not produce an acceptable crinkle type emboss.

In formulating an ultraviolet coating over a flexible vinyl substrate, it is extremely important to match the coating to the substrate to produce a crinkle emboss. The physical properties of the ultraviolet radiation curable coating should be formulated to considerably lower elongation properties than that of the flexible vinyl substrate so that upon exposure to elevated temperatures, a permanent and reproducible distortion can take place which results in a uniform crinkle emboss.

In practicing the invention, there are a wide range of crinkle type emboss effects which can be achieved depending on the formulation variables of the physical properties of the flexible substrate, the physical properties of the ultraviolet curable coating employed, the thickness of the coatings, and the temperatures employed.

The flexible vinyl substrate can be in the form of a solid vinyl substrate such as a decorative vinyl laminate or it may be a foamed vinyl with a solid skin or topcoat as is conventionally manufactured for floor and wall coverings.

Generally speaking, the clear vinyl overlay will have a thickness of from 5 to 20 mils; however, even greater thicknesses can be employed where it is found to be suitable.

The thickness of the ultraviolet curable coating is preferably in the range of 0.5 to 5.0 mils; however, even greater thicknesses are contemplated for the desired effects.

It has been found that with the combination of a flexible vinyl substrate with a given set of physical properties and an ultraviolet curable coating with a given set of physical properties that by varying the ratio of thickness of one to the other various shapes and sizes can be achieved.

Figure 2:
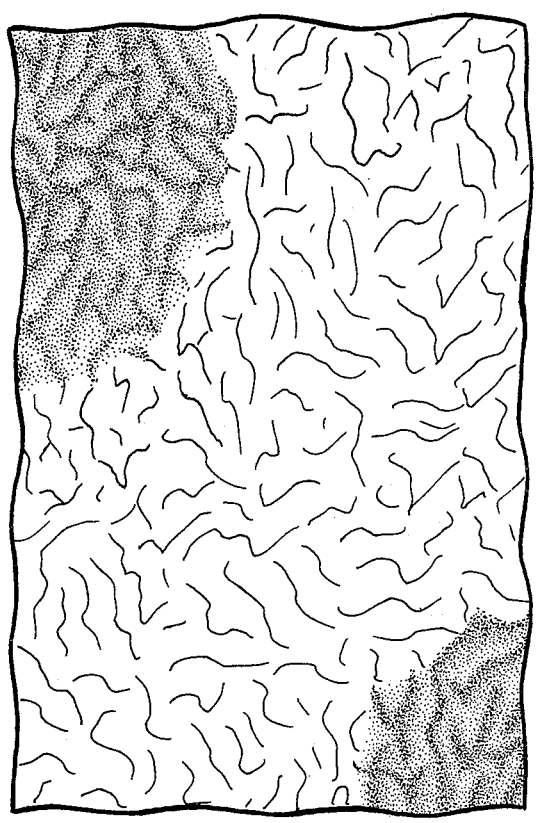
FIGS. 2 and 3 show the comparison of texture achieved with different coating thicknesses.
Figure 3:
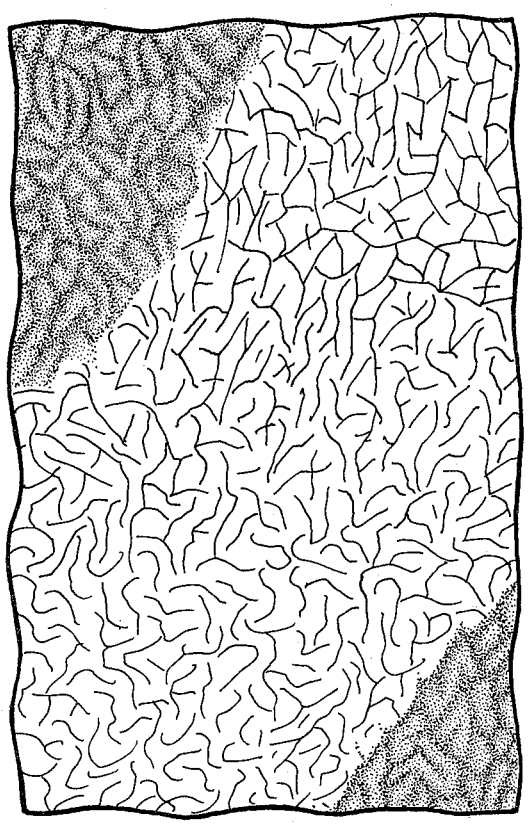

For instance, by varying the thickness of the ultraviolet coating from 0.5 mils to 5.0 mils in increments of 0.5 mils and keeping the flexible vinyl substrate of constant thickness, the crinkle texture can be changed from a small crinkle to a rather large crinkle (see FIGS. 2 and 3). On the other hand, by maintaining a constant thickness of ultraviolet curable coating and varying the thickness of the flexible vinyl substrate, variation in size of crinkle emboss can be achieved. Also, it has been found that by going to relatively low flexible vinyl topcoat thicknesses and keeping the ultraviolet curable coating thickness constant that the crinkle emboss can be achieved at lower operating temperatures.

Generally speaking, the wider the variation in physical properties between the ultraviolet curable coating and the flexible vinyl substrate under the same processing conditions the more dispersed the crinkle texture appears. Also, the size of the crinkle can be affected to some extent by operating temperatures. Higher operating temperatures will enlarge the size of the crinkle emboss to a certain extent.

Crinkle emboss variations generally can vary in height between the raised and depressed areas of from 0.005 to 0.025 inches. The surface texture can vary from a fine texture having between 25 to 30 crinkles per square inch to the larger more dispersed crinkles having 12 to 15 crinkles per square inch.

While a process and the product of the process have been described wherein an actinic radiation curable coating is applied to a smooth flexible vinyl surface with a resulting texturing of the surface after curing and exposure at elevated temperatures, this invention is not limited to such smooth surfaces. On the contrary, it has been found, for instance, that curing an actinic radiation coating over a foamed and previously embossed flexible vinyl sheet further desirable affects can be achieved. For example, where there are areas which are foamed to varying heights and other areas which are relatively solid vinyl or unfoamed, as a result of chemical inhibition of the blowing agent in selected areas or by mechanically crushing the foam in selected areas or even by rotary screen printing of foamable plastisols in selected areas, exposure to elevated temperature in the range of 200°–250° F. gives novel and unexpected shapes and designs which could not otherwise be achieved.

Figure 4:
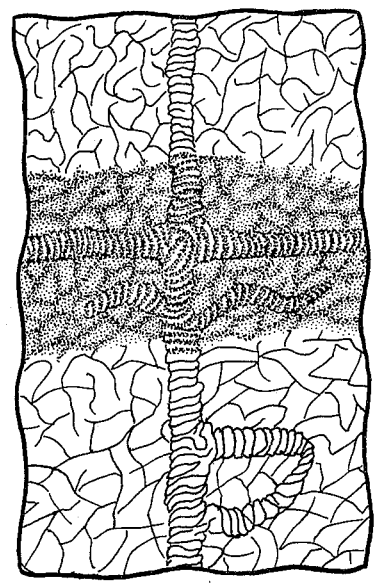
FIG. 4 shows the relative contrast achieved where there is a variance in the elongation properties of the flexible substrate.

In the areas of the sheet where there is relatively solid vinyl or very little foaming, the elongation properties are such that a fine crinkle texture takes place and in the areas where there is considerable foaming and higher elongation a larger more dispersed crinkle takes form. For example, FIG. 4 shows a typical pattern of floor covering where the grouted area is a more concentrated vinyl due to chemical inhibition. As a result, its texture is a concentrated crinkle as contrasted to the foamed area displaying a more dispersed crinkle. The employment of the crinkle emboss over an existing embossed design results in new pleasing and desirable shapes and embossments which substantially enhances the pattern. It has also been found that pigmenting the actinic radiation coatings gives further 3-dimensional effects. It should be mentioned that crinkle emboss is produced through the combination of properties of the actinic radiation cured coating and the flexible substrate. Whether the actinic radiation coating is the topcoat or it is applied to a substrate, foamed or unfoamed, and a coating is applied to the actinic radiation coating the crinkle will still be produced. However, because of the excellent gloss and wear properties it is more desirable to have the actinic radiation cured coating as the topcoat.

In one practical application of the invention, an asbestos felt substrate 35 mils thick is coated with a flexible foamable vinyl plastisol, 14 mils thick, heated to gel the foamable composition in a forced air oven at 275° F., afterwhich, a multi-colored decorative pattern is applied to the surface of the gelled coating. The thus printed vinyl gel is then coated with a clear vinyl overlay, 14 mils thick, and passed through a high temperature oven (350° to 450° F) to fuse the clear vinyl overlay while at the same time expanding the flexible foam underlay to the required thickness. The foregoing foam layer and overlay are the following:

| Foam Formulation Ingredients | Parts | Clear Vinyl Overlay Formulation Ingredients | Parts |
|---|---|---|---|
| Polyvinyl Chloride (dispersion grade Inherent viscosity 0.81) | 70 | Polyvinyl Chloride (dispersion grade Inherent viscosity 1.40) | 65 |
| Polyvinyl Chloride (large size blending resin) | 30 | Polyvinyl Chloride (dispersion grade Inherent viscosity 1.50) | 35 |
| Modified Alkyl (iso $C_7$-$C_9$) Aryl Phthalate | 50 | Modified Alkyl (iso $C_7$-$C_9$) Aryl Phthalate | 35 |
| Di(2-Ethylhexyl) Phthalate | 9 | 2,2,4 Trimethyl-1,3-pentanediol diisobutyrate | 7.5 |
| Titanium Dioxide (60% dispersion in DOP) | 10 | V.M. & P. Naptha (boiling range 190°–275° F.) | 2.5 |
| Azodicarbonamide (50% dispersion in DOP) | 5.5 | 2,hydroxy 4, octyloxy benzophenone | 0.5 |
| Cadmium/Zinc Octoates | 1.5 | | |
| V.M. & P. Naphtha (Boiling Range 190°–275° F.) | 5.0 | | |
| Polyethylene Glycol Monolaurate (400 Mol. Wgt) | 1.0 | | |

Physical Properties of Foamed Vinyl Substrate

| Tensile Strength, psi | 2,750 |
|---|---|
| 100% Modulus, | 1,850 |
| Elongation, % | 220 |

The expanded vinyl sheet, upon exiting the oven, is cooled to 150° F., afterwhich, a 100% solid ultraviolet curable coating is applied at a coating thickness of 2.5 mils comprising the following:

| Ingredients | Parts |
|---|---|
| Acrylourethane Oligomer | 70 |
| 2-ethylhexyl acrylate | 30 |
| Hexanedioldiacrylate | 4 |
| Benzoin Butyl Ester | 1 |

The medium molecular weight isocyanate terminated urethane oligomer was prepared in 2-ethylhexylacrylate monomer; a stoichiometric amount of hydroxyethylacrylate was added to accomplish the acrylate capping.

Physical Properties of the Ultraviolet Curable

| Coating | |
|---|---|
| Tensile Strength, psi | 2,900 |
| 100% Modulus | 61,000 |
| Elongation, % | 26 |

The coated web is then passed through an ultraviolet lamping oven. An appropriate gas sweep is employed, that is, if the ultraviolet curable coating is one that requires a nonoxidizing environment nitrogen gas sweep is used. If the ultraviolet curable coating can be cured in air, an air sweep is employed. The ultraviolet lamping oven is a series of 100 Watt/inch medium pressure mercury arc lamps operating in the 1800A to 4000A wavelength range. The web, upon exiting the ultraviolet lamping oven will be in the range of 200° F. to 250° F. depending on the line speed and coating thickness resulting in a uniform crinkle embossed surface. The web is then cooled and rolled for shipment.

An infrared oven may be employed after the ultraviolet lamping oven to control the temperature and crinkle texture. The viscosity of the ultraviolet coating is extremely important to achieving the necessary leveling characteristics required.

Viscosities for ultraviolet curable systems are generally in the range of 3,000 to 15,000 cps at ambient temperatures. Much higher viscosity coatings may be used; however, very low viscosity coatings are generally avoided.

The ultraviolet curable coating can be applied by means of a direct roll coater; however, other means of application such as spray coating, curtain coating, extrusion coating and the like can be employed.

Nitrogen is the preferred gas sweep for ultraviolet curable coating requiring a non-oxidizing atmosphere. The volumes of nitrogen sweep maintained across the web will depend mainly on the line speed and the opening gap between the web and the lamps.

If a high enough flow of nitrogen is not maintained to exclude oxygen, there can be some oxygen inhibition of surface cure which can result in a tacky surface with poor physical property development of the coating.

Whether the ultraviolet curable coating be an inert or air cure system, sufficient gas sweep (Nitrogen or Air) is necessary because at operating temperatures of 150° F.–250° F. there can be some volatilization of the reactive monomers in the ultraviolet lamping oven which must be removed; otherwise, they will deposit on the lamps and reflectors and degrade. The resulting deposition and degradation of reactive monomers leads to loss of efficiency of the ultraviolet lamps and can lead to incomplete cure. The gas sweep should be such that it, in effect, sets up a laminar flow holding monomer fumes on the moving web and exhaust said fumes out of the exit of the ultraviolet lamping oven.

The amount of ultraviolet lamps and lamp intensity is governed by line speeds, coating chemistry and thickness of coating. The thus coated and crinkle embossed surface that has been produced on the flexible vinyl substrate is highly desirable for commercially acceptable sheet goods including floor and wall coverings, table coverings, book covers, coated fabrics for use in upholstery, clothing and automobile interiors, shoes, handbags, luggage, decorative vinyl laminates and the like.

Although particular embodiments of the invention have been shown and described in full here, there is no intention to thereby limit the invention to the details of such embodiments. On the contrary, the intention is to cover all modifications, alternatives, embodiments, usages and equivalents of the invention as fall within the spirit and scope of the invention, specification and the appended claims.

What is claimed is:

1. A method for creating a crinkle finish surface on a flexible foamed decorated substrate in an uninterrupted process comprising the steps of,
    coating a vinyl overlay over a decorated foamable substrate,
    exposing the coated flexible decorated substrate to an elevated temperature whereupon the foamable coat has expanded to a cellular foam and the vinyl overlay is fused,
    cooling the thus foamed and fused vinyl substrate to a temperature compatible with the application of an actinic radiation curable coating,
    passing the thus foamed and fused vinyl substrate through a coating station where an essentially solvent free acrylourethane oligomer actinic radiation curable coating of lower elongation properties than that of the vinyl overlay is applied at temperatures less than 180° F.,
    thereafter curing said coating upon exposure to actinic radiation at elevated temperatures between 180° and 250° F. for less than one minute,
    whereupon exposure to said radiation at said elevated temperature results in a product exhibiting a crinkle surface texture which has been created on the surface of the flexible substrate by permitting the differential elongation properties of the vinyl overlay and the actinic radiation cured coating to interact to give the crinkle surface texture.

2. The process of claim 1, wherein the overlay is applied over a flexible foamable polyvinyl chloride substrate.

3. The process of claim 2, wherein the polyvinyl chloride substrate contains polyvinyl chloride resins, plasticizers, heat stabilizer and light stabilizer.

4. The process of claim 1, wherein the flexible substrate is a foamable polyvinyl chloride substrate and contains polyvinyl chloride resins, plasticizers, blowing agent, pigment and activators proportioned to provide a blowing capability of at least 200%.

5. The process of claim 1, wherein a carrier is provided for the flexible substrate which is a felt like sheet.

6. The process of claim 1, wherein the actinic radiation cured coating includes a reactive base polymer.

7. The process of claim 1, wherein the actinic radiation cured coating includes a U.V. photosensitizer.

8. The process of claim 1, wherein the actinic radiation cured coating includes reactive monofunctional crosslinking monomers and multi-functional crosslinking monomers.

9. The process of claim 1, wherein said essentially solvent free acrylourethane oligomer actinic radiation curable coating includes acrylyl groups of the structure $H_2C=CHCO-$.

10. The process of claim 1, wherein the actinic radiation polymerization reaction takes place in a non-oxidizing environment.

11. The process of claim 10, wherein an inert gas is swept over the coated sheet to exclude oxygen and remove volatile monomers from contacting with the actinic radiation source.

12. The process of claim 1, wherein the actinic radiation polymerization reaction takes place in air.

13. The process of claim 12, wherein air is swept over the coated sheet to remove any residual monomers from contacting with the actinic radiation source.

14. The process of claim 1, wherein the actinic radiation cured coating is between 0.0005 and 0.005 inches.

15. The process of claim 1, wherein the substrate is between 0.005 and 0.250 inches.

16. The process of claim 1, wherein the elevated temperature is in the range of 200°–240° F.

17. The process of claim 1, wherein the crinkled surface finish is achieved in combination with a previously chemically embossed flexible substrate.

18. The process of claim 1, wherein the crinkled surface finish is achieved in combination with a previously mechanically embossed flexible substrate.

19. The process of claim 1, wherein the crinkled finish is achieved in combination with an embossed flexible substrate which has been accomplished by rotary screen printing of foamable plastisols.

* * * * *